Figure 1:
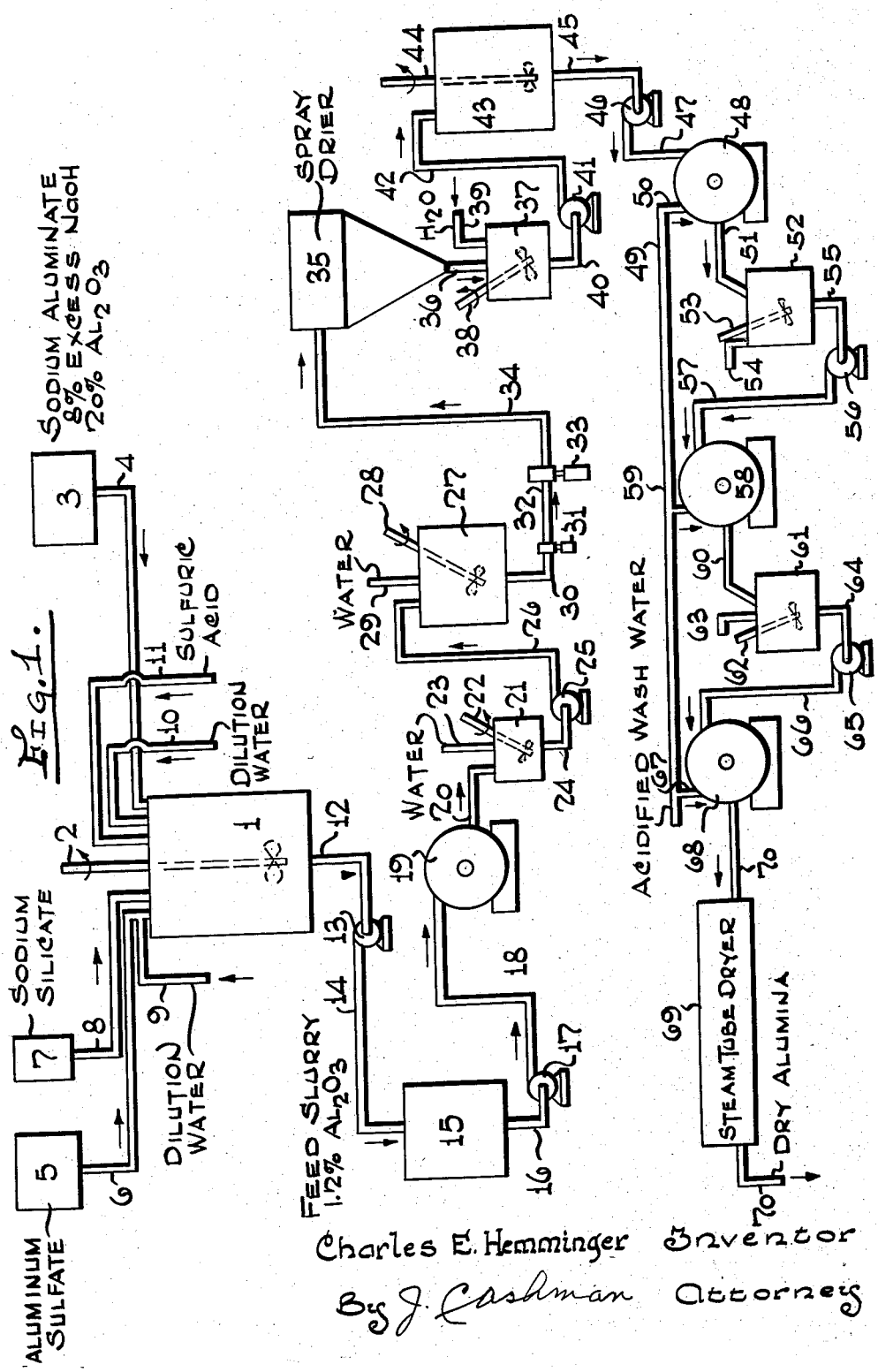
Figure 2:
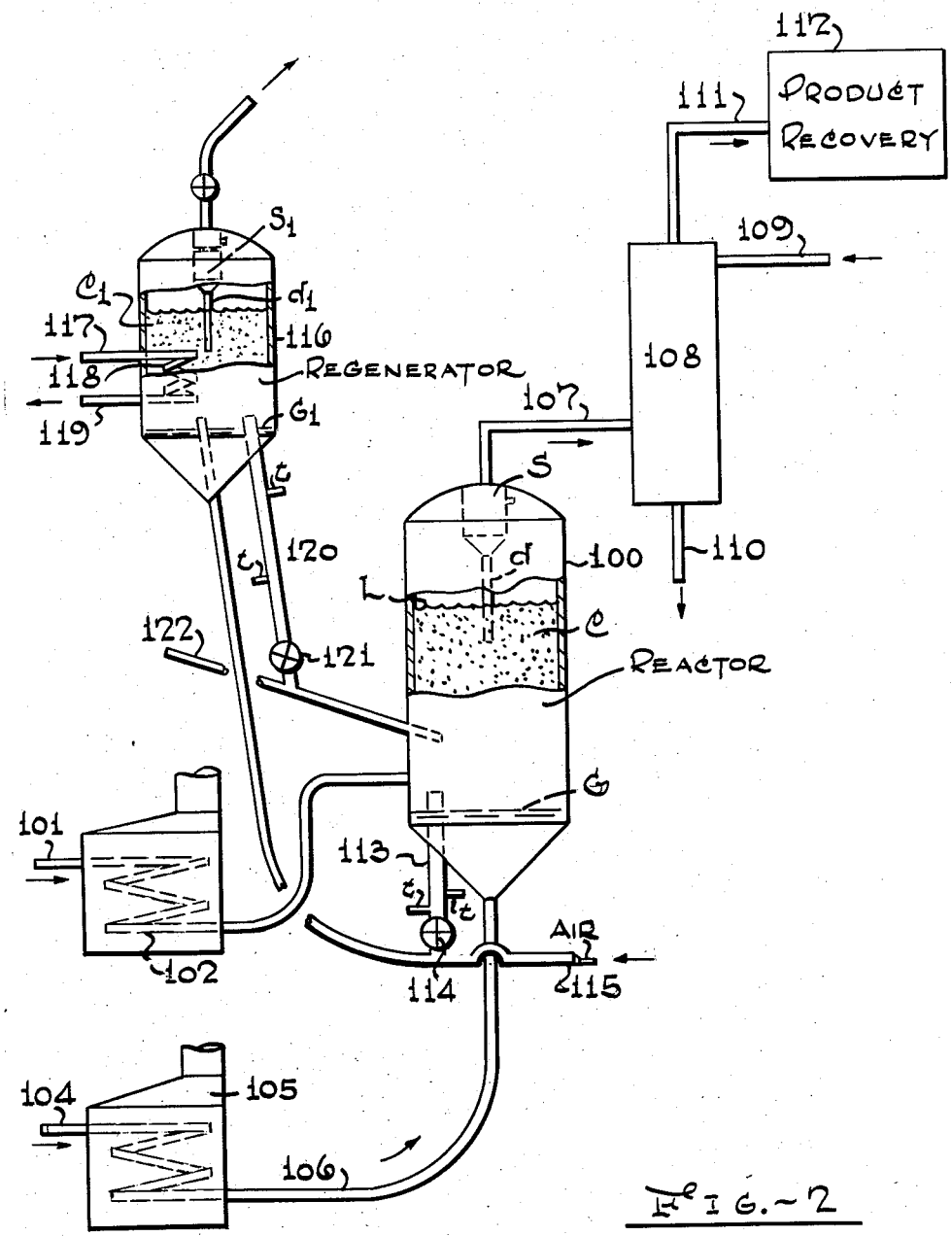

United States Patent Office 2,894,900
Patented July 14, 1959

2,894,900

HYDROFORMING PROCESS USING IMPROVED SILICA-ALUMINA CATALYST BASE

Charles E. Hemminger, Westfield, N.J., assignor to Esso Research and Engineering Company, a corporation of Delaware Application December 21, 1954, Serial No. 476,702

7 Claims. (Cl. 208—135)

The present invention relates to the preparation of new and improved aluminas which are especially useful as supports for active hydrotreating catalysts components.

The present invention also relates to the process of hydrotreating hydrocarbons, and in particular it relates to hydroforming naphthas containing naphthenes in order to produce high anti-knock rating gasoline motor fuel constituents by contacting the feed naphthas at elevated temperatures and pressures with molybdenum oxide or other known hydroforming catalysts carried on a suitable support, such as alumina.

The invention relates more particularly to the hydrotreating of naphthas with catalysts containing alumina as the support or spacing agent, in which the alumina is present in a state in which it is more efficient and otherwise more suitable than the large multiplicity of catalyst supports which have heretofore been proposed or used.

Hydroforming is customarily defined as an operation in which a hydrocarbon, such as a naphtha, is contacted at elevated temperatures and pressures in the presence of added hydrogen with a solid catalyst material. There is no net consumption of hydrogen during the process ordinarily. The process involves (1) dehydrogenation of naphthenes to form the corresponding aromatics, (2) aromatization of paraffinic hydrocarbons, (3) isomerization of hydrocarbons wherein, for example, straight chain paraffins rearrange to form branch chain hydrocarbons and 5-membered carbo-cyclic rings are converted to 6-membered carbo-cyclic rings, and (4) hydrocracking of paraffins. When properly operated, the process should yield a maximum amount of $C_4+$ hydrocarbons and minimum amounts of dry gas and carbon.

The main object of the present invention is to provide an improved alumina support for active hydrotreating catalyst components.

It is a further object of this invention to provide a catalyst base for use in hydroforming which is adapted to promote the conversion of low octane hydrocarbon feed stock into gasoline constituents of high octane rating in good yields.

Another object of the present invention is to provide a hydroforming catalyst of high activity and long catalyst life.

A further object of the invention is to provide a catalyst base of improved efficiency.

Another object of the present invention is to provide a hydroforming catalyst which, when in the form of a powder, is adapted for use as a dense fluidized bed in a hydroforming zone, which powdered catalyst possesses high resistance to attrition.

Stated briefly, the present invention provides a catalyst base or spacing agent for active hydrotreating catalyst components which is prepared by treating sodium aluminate in aqueous solution with aluminum sulfate and adding from 1 to 5 weight percent silica, preferably 2 weight percent (based on the $Al_2O_3$ content of the spacing agent), thereafter spray-drying the base and adding, as by impregnation, "dry mix" technique, etc., known hydrotreating catalyst components such as compounds of metals of groups V–VIII of the periodic system as well as certain of the metals themselves such as molybdenum oxide, chromium oxide, cobalt oxide, vanadium oxide, tungsten oxide, molybdates and chromates, especially cobalt molybdate, sulfides such as molybdenum sulfide, nickel-tungsten sulfide, platinum, palladium, rhodium, and the like.

In carrying out the present process of hydroforming, a naphtha feed stock is vaporized and heated to a temperature within the range of from about 900°–1050° F. These naphtha vapors contain substantial amounts of naphthenic hydrocarbons, some aromatics and some paraffins, and the feed stock is one which may be a virgin naphtha, a cracked naphtha, or a mixture of the two.

However, since one of the main features of the present invention resides in the manner in which the base or spacing agent for the active component of the hydroforming catalyst is made, complete details as to the best method for preparing this base will now be set forth.

In the accompanying drawing there is set forth in Figure I, diagrammatically, a flow sheet indicating the steps for preparing the improved alumina base for the hydroforming catalyst, and in Figure II, a flow plan depicting the essential apparatus of a hydroforming plant.

Referring in detail to the drawing, 1 represents a mixing tank provided with a suitable stirrer 2 to which the following are added:

From storage 3, which contains an aqueous solution of sodium aluminate in a concentration by weight of 20% $Al_2O_3$ with 8 weight percent excess NaOH, there is charged via line 4 to tank 1, a quantity of this sodium aluminate material. Simultaneously, from storage 5, there is withdrawn through line 6 and charged to tank 1 a quantity of aluminum sulfate. From storage 7, which contains sodium silicate, this material is withdrawn through line 8 and also charged to tank 1. Dilution water is also added to the tank 1 from lines 9 and 10, respectively.

The ingredients listed above are vigorously stirred by causing rotation of agitator 2. The proportions of the aluminum-containing ingredients mentioned above are such that two-thirds of the alumina precipitate comes from the sodium aluminate and one-third from the aluminum sulfate. Sufficient sulfuric acid to adjust the pH of the mixture in tank 1 to about 9–10, preferably about 9.5, is added to tank 1 through line 11. The mixture in tank 1 is maintained at a temperature of about 40°–120° F., 60°–80° F. preferred, and pressure in the tank is atmospheric. Precipitation of the alumina is accomplished in a few minutes, say, 3–5 minutes.

An aqueous slurry containing the precipitated alumina is withdrawn from tank 1 through line 12 and then pumped by pump 13 through line 14 to a filter feed tank 15. The concentration of $Al_2O_3$ by weight in this feed tank is about 1.2%. The slurry in tank 15 is withdrawn through line 16 and thence pumped by pump 17 through line 18 to a primary filter 19, wherein the said slurry is filtered, and the filter cake comprising the alumina is withdrawn at 20 and charged to a mixing tank 21 provided with driven agitating means 22, and to which tank dilution water is added via line 23. Referring again to filter 19, the filtrate is discarded. The purpose of filtering the slurry is to separate the alumina from excess alkali and other impurities, which alumina is then delivered to tank 21 and mixed with fresh water to facilitate subsequent spray drying.

The aqueous medium containing the alumina in tank 21 is withdrawn through line 24 and then pumped by pump 25 through line 26 to a mixing tank 27 provided with driven agitator means 28, and to which a further quantity of water is added through line 29. After thorough stirring in 27 (as is accomplished in tank 21), the material is withdrawn from tank 27 through line 30, thence passed through a pump 31, thence passed through line 32, through to a high pressure pump 33, which latter pump delivers the slurry via line 34 to a spray dryer 35.

The succession of dilutions and the filtering step, previously described, serve to remove from association with the alumina substantially all of the extraneous material (e.g., sodium ions, sulfate ions, etc.) so that material delivered to spray dryer 35 contains approximately 5.6 parts percent by weight of total solids, of which 5 parts by weight is $Al_2O_3$.

Spray dryer 35 may be of any conventional type, such as a Swenson or Bowen spray dryer type. The temperature conditions maintained in the spray dryer to effect the desired dehydration are substantially the following, namely, the inlet temperature is about 800° F. while the outlet temperature is about 300° F. The spray dried alumina is withdrawn through line 36 and delivered to tank 37 provided with a suitable driven agitating means 38, and to which water is added through line 39. Again, the alumina is agitated in the aqueous medium and the resultant slurry is withdrawn through line 40, and pumped by a pump 41, through line 42 into tank 43 provided with driven agitating means 44. The aqueous medium is vigorously agitated for several minutes and the slurry is withdrawn through line 45, passed through pump 46 and line 47 to a wash filtering means 48 where it is contacted with acidified wash water obtained from manifold 49 to branch line 50. The washed precipitate is withdrawn from filter 48 through line 51 and charged to the dilution tank 52 provided with a driven stirring means 53 to which tank water is added through line 54. The alumina is again vigorously agitated in this aqueous medium for a few minutes, thence withdrawn through line 55 and pumped by pump 56, through line 57 to a second wash filter 58 on which latter filter it is again treated with the aqueous wash water contained in manifold 49 which is fed to said filter through line 59. The precipitate is withdrawn from the wash filter 58 through 60 and delivered to a dilution tank 61 provided with a driven stirrer 62 and to which dilution water is added through line 63. In this tank 61 the alumina-containing aqueous medium is vigorously stirred for a few minutes (again, say, 3–5 minutes), thence withdrawn through line 64 and pumped by pump 65 through line 66 to a third wash filter 66 where, again, it is treated with acidified water withdrawn from manifold 49 through line 67. The alumina is withdrawn from wash filter 66 via line 68 and passed through a steam tube dryer 69, and the dry product is finally recovered from line 70 and delivered to storage. It will be understood that any suitable drying means may be employed in lieu of the steam tube dryer previously mentioned. It is also pointed out that the acidified wash water in manifold 49 contains sulfuric acid equivalent to 14 grams calcium sulfate per gallon of liquid.

There is thus indicated by the accompanying schematic flow plan the succession of steps performed in a preferred method of making an alumina composition also containing silica.

In order further to describe the invention, it is pointed out that in tank 1 dilute aluminum sulfate is mixed with partially acidified sodium aluminate solution. The solution concentrations are adjusted to give a precipitate in tank 1 containing about 1.2 weight percent alumina. The quantity of aluminum sulfate added is carefully controlled so as to reach the desired pH of 9–10.

The gel slurry is pumped to a filter tank and is dewatered on the primary filter 19. It is pointed out that the rate of filtering is quite sensitive to the pH of alumina precipitation. For example, at pH values in the range of 10–10.3 it is very difficult to dewater the slurry, and consequently the pH in the tank 1 must be maintained below 10, and preferably within the range of from 9–9.5, whereupon the filter rate is greatly increased.

The spray-dried base prepared as explained above is in the form of microspheres and possesses a hard glassy appearance.

In preparing a hydroforming catalyst the base or carrier is impregnated with the water soluble molybdenum salt which is, at the same time, heat decomposable. The impregnated base is dried, heated and finally calcined. The amount of molybdenum salt impregnated into the base is such as to give a molybdenum oxide ($MoO_3$) content of about 10% based on the total weight of the catalyst. As much as 15–20% molybdenum oxide may be added for special catalysts. It will be understood, of course, that other known hydrotreating, hydroforming and/or aromatizing catalysts such as chromium oxide, vanadium oxide, tungsten oxide, cobalt oxide, nickel oxide, molybdenum sulfide, cobalt molybdate, nickel-tunsten sulfide, platinum, palladium, and the like, may be incorporated into the base prepared as described above. Furthermore, the catalyst may be prepared by dry mixing the active component of the catalyst with the base and heating. The present invention does not go to the method of incorporating the active component of the catalyst into the base, and, therefore, any known procedure may be employed.

In Figure II there is shown the essentials of an apparatus in which a continuous hydroforming operation may be carried out employing a fluidized catalyst technique. Referring in detail to Figure II, 100 represents a reactor containing a bed of powdered fluidized catalyst extending from grid G to an upper dense phase level L. The hydrocarbon to be hydroformed, say, a virgin naphtha containing 35 volume percent of naphthenes with a relatively small amount of aromatics and a major proportion of paraffin hydrocarbons, is charged to the system via line 101, thence passed through a furnace 102 where it is heated to a temperature of around 950°–1000° F., and thence passed via line 103 into a lower portion of a bed of catalyst C, but above the grid $G_1$ in reactor 100. Simultaneously, a hydrogen-containing gas in line 104 (this gas is obtained from the product recovery system and commonly referred to as recycle gas) is heated in furnace 105 to a temperature of, say, 1200° F., and thence passed via line 106 into the bottom of reactor 100. This recycle gas usually contains 65–75% hydrogen, the remainder being normally gaseous hydrocarbons. The following conditions are maintained in reactor 100:

| | |
|---|---|
| Catalyst | 0.3 lb. of 10% molybdenum oxide on disclosed base per lb. of oil fed. |
| Catalyst particle size range | 5% less than 30 mu. 5% more than 100 mu. |
| Temperature | 900°–950° F. |
| Pressure | 100–350 p.s.i. |
| Superficial velocity of gasiform material in reactor 100. | 0.5–1.0 ft. per sec. |
| Residence time of reactants in reactor 100. | 30–120 seconds. |

Under the conditions disclosed above, the desired reaction occurs and the product admixed with hydrogen passes from a dense phase extending from G to L into a light phase suspension of catalyst in gasiform material, extending from L to the top of the reactor. Before discharge from the reactor, the gasiform material is forced through a plurality of gas-solids separators S (one shown) wherein entrained catalyst is separated from the gasiform material and returned to the dense phase through dip pipes d (one shown). The raw product emerges from the reactor 100 through line 107 and thence is charged to the bottom portion of a scrubber 108 wherein it flows countercurrently upward against the downflowing oil charged to scrubber 108 through line 109. The downcoming oil, which is cooler than the gasiform material charged to the scrubber 108, washes out whatever catalyst is still entrained in the vapors and causes condensation of the higher boiling polymers present in the crude product. The portion of the product which undergoes condensation, plus the added scrubbing oil, plus the catalyst removed from the gasiform material, is withdrawn as a slurry from the bottom of scrubber 108 through line 110. This slurry may be returned to the reactor 100 or rejected from the system. The uncondensed gasiform material is withdrawn from scrubber 108 overhead through line 111 and is charged to a product recovery system 112 wherein the "hydroformate" is recovered and hydrogen gas is also recovered for recycle to line 104.

Since the catalyst undergoes contamination by carbonaceous and other deposits during the hydroforming operation in reactor 100, it is necessary to regenerate the catalyst. Toward this end catalyst is withdrawn from the reactor 100 through drawoff line 113 carrying the usual gas taps $t$ and controlled by a valve 114 and charged into a stream of air in line 115 wherein it is formed into a suspension and carried into regenerator 116 where it is formed into a fluidized bed $C_1$ extending from a grid $G_1$ to an upper dense phase level $L_1$. In a manner entirely analogous to that in which the bed of fluidized catalyst was formed in the reactor 100, the catalyst in regenerator 116 is formed into a second fluidized bed, mainly, by controlling the superficial velocity of the upflowing regeneration gas. The treatment of the fouled catalyst in regenerator 116, or other oxygen-containing gas, substantially frees the catalyst of contaminating carbonaceous and sulfurous deposits, and the regeneration fumes pass from the dense phase into an upper dilute phase extending from $L_1$ to the top of the reactor. Before the fumes are rejected from the regenerator 116 they are forced through a series of gas-solids separating devices $S_1$ (one shown) wherein entrained catalyst is separated from the said fumes and returned to the dense phase through a plurality of dip pipes $d_1$ (one shown). In order to prevent overheating of the catalyst in regenerator 116, a cooling fluid in line 117 is charged to a coil 118 disposed in the bed of catalyst wherein heat is abstracted from the said bed of catalyst, the cooling fluid being withdrawn through line 119. The regenerated catalyst is withdrawn from regenerator 116 through drawoff pipe 120 carrying the usual gas taps $t$ and controlled by a valve 121 and charged into a stream of recycle gas in line 122, wherein it is formed into a suspension and returned to the reactor.

The temperature in the regenerator is maintained between 1150°–1200° F. and the circulation rate of catalyst from the regenerator to the reactor is from 1 to 3 parts of catalyst per part of oil.

If desired, the catalyst may be treated with hydrogen in a separate vessel in the case where the catalyst contains a VI group metal oxide, such as molybdenum oxide, to partially reduce the said oxide to a lower valency state. Furthermore, water may be added to the catalyst entering the reactor. This water, however, is preferably added to the recycled hydrogen-containing gas so as to provide a concentration of water entering the reactor of some ½ to 1 mol percent $H_2O$ per mol of $H_2$ entering the reactor.

In order further to explain the present invention, the following data are set forth.

EXAMPLE I

The catalyst used here was one in which the base consisted of about 97.1 weight percent $Al_2O_3$ and 2.9 weight percent $SiO_2$. This base carried about 10% $MoO_3$ based on the total weight of the catalyst and carrier. The catalyst had the following physical characteristics:

(a) Surface area _____ m.²/g__ 135
(b) Pore volume _____ cc./g__ .48

This catalyst is utilized in hydroforming a feed of the following characteristics:

Feed:
  ° API _____ 56.9
  Initial boiling point _____ ° F__ 207
  10 _____ ° F__ 228
  50 _____ ° F__ 250
  90 _____ ° F__ 290
  Final boiling point _____ ° F__ 334

Inspection of feed:
  Aromatics, weight percent _____ 10
  Olefins, weight percent _____ 0
  Naphthenes, weight percent _____ 39
  Paraffins, weight percent _____ 51
  Octane number (research) _____ 50.2
  Aniline point, ° F. _____ 127

A naphtha feed of the above characteristics was hydroformed in the reaction zone maintained at a pressure of about 200 p.s.i.g. while maintaining a temperature in said reaction zone of 925° F. Hydrogen was charged to the reaction zone in the amount of about 5000 cubic feet measured to standard conditions per barrel of oil. The concentration of hydrogen in the hydrogen-containing gas was about 65%.

Operating as above indicated to obtain a 95 octane number (research) product, the following results were obtained as indicated in column A below. In column B the same feed stock was treated in exactly the same manner as the feed stock of column A, but in this case a conventional carrier or base was used to support the molybdenum oxide used in both runs.

|  | A | B |
|---|---|---|
| $C_5$+hydroformate, Volume Percent | 79 | 78 |
| $C_4$ | 7.5 | 7.5 |
| Dry gas, Weight Percent | 10 | 11 |
| Carbon, Weight Percent | 0.6 | 0.8 |
| Required space feed rate for 95 O.N., lbs. oil/hr./lb. catalyst in reactor | 0.37 | 0.26 |
| Volatility of $C_5$–430° F. fraction at 95 O.N.: | | |
|   Percent off at 158° F | 7 | 5 |
|   Percent off at 212° F | 31 | 26 |
|   Percent off at 257° F | 64 | 63 |
|   Percent off at 302° F | 92 | 92 |
| Gravity, ° API | 47 | 46 |

It can be seen from the immediately foregoing table that the use of the new and improved base or carrier of the present invention has the following advantages:

(1) Improved liquid yield (less dry gas)
(2) Lower carbon
(3) Higher activity
(4) Improved volatility These advantages are apparent from a study of the table immediately above.

In the fluid operation it is essential that the powdered catalyst have good attrition resistance. In other words, the catalyst must have sufficient mechanical strength to withstand physical disintegration when employed during a process utilizing the fluidized catalyst technique. The data below show that the catalyst A which contains the improved base had superior attrition resistance to the conventional catalyst B, as follows:

|  | A | B |
|---|---|---|
| Attrition resistance, lbs. of 0–40 micron material formed per day per 100 lbs. of 40+ micron material in reactor | 0.5 | 2.0 |

Catalysts supported upon alumina prepared in accordance with the present invention, particularly those consisting of molybdenum oxide alone or admixed with cobalt oxide, molybdenum sulfide, nickel-tungsten sulfide, or cobalt molybdate, are useful in other hydrotreating operations. Specifically, catalysts containing 5 to 20 weight percent cobalt molybdate are especially valuable for hydrofining of heating oil fractions boiling in the range of from 400°–1100° F., particularly cracked oil fractions boiling within this range. The hydrofining operation conducted on the cracked oil is desirably a "mild hydrofining operation."

The temperatures used in the hydrofining treatment are in the range from about 400° F. to 700° F., preferably in the range from about 500° F. to 650° F. Pressures employed are in the range from 50 to 250 pounds per square inch, preferably in the range from about 100 to 200 pounds per square inch. The feed rats are ordinarily in the range from about 1–16 volumes of liquid per volume of catalyst per hour. Preferred feed rates are most often in the range from 1–5 v./v./hr. The hydrogen in the gas to the hydrofining unit may vary from 50 to 100%. This means that, for example, dilute hydrogen from a hydroformer can be used in the hydrofining process. A particularly desirable method of hydrofining is to recycle appreciable quantities of hydrogen to the hydrofining unit in order to prevent carbonization of the catalyst.

It is to be understood that the mild hydrofining conditions are secured by the adjustment of the above-named operating conditions. For instance, if a relatively high liquid feed rate is used as compared to the amount of catalyst present, the higher temperature range may be employed. On the other hand, if a very active catalyst is used, it is desirable to use a relatively high feed rate or to use a relatively low temperature. The mild hydrofining conditions are measured by the amount of hydrogen consumption per barrel or oil feed. Conventional hydrofining operations utilized for the desulfurization of certain stocks are conducted under conditions whereby the hydrogen consumption ranges from 150 to 600 standard cubic feet of hydrogen per barrel of oil. These operations used heretofore in the art secured a substantial sulfur reduction (50% to 90%). In the so-called "mild hydrofining operation" operating conditions are adjusted so that the hydrogen consumption in standard cubic feet per barrel does not exceed 60 and is preferably less than 40. Furthermore, the extent of the sulfur reduction when utilizing the mild hydrofining conditions is often as little as about 20%.

The effectiveness of the catalysts of the present invention in the hydrofining of heating oils may be more clearly seen from the following experiments.

In evaluating these catalysts, experiments were conducted in which heating oils were hydrofined according to the principles set forth. Heating oils used in these experiments had the inspections indicated in the following table:

*Table 1*

|  | Stock A | Stock B | Stock C | Stock D |
| --- | --- | --- | --- | --- |
|  | West Texas Light Virgin Heating Oil | Doctor Sweetened West Texas Virgin Heating Oil | 700° F.E.P. Heavy Catalytic Heating Oil | Blend of Thermal and Catalytic Heating Oil |
| Gravity, °API | 36.6 | 36.8 | 21.9 | 22.9 |
| Distillation: |  |  |  |  |
| IBP, °F | 332 | 330 | 402 | 385 |
| 5% at °F | 387 | 392 | 490 | 476 |
| 10% | 398 | 408 | 508 | 494 |
| 20% | 416 |  | 531 | 516 |
| 30% | 432 | 456 | 552 | 532 |
| 40% | 444 |  | 571 | 548 |
| 50% | 456 | 497 | 593 | 566 |
| 60% | 468 |  | 610 | 582 |
| 70% | 481 | 546 | 633 | 600 |
| 80% | 495 |  | 650 | 618 |
| 90% | 512 | 608 | 670 | 638 |
| 95% | 528 | 633 | 690 | 653 |
| FBP, °F | 534 | 658 | 696 | 663 |
| Recovery, percent | 96.0 | 99.0 | 97.0 | 98.0 |
| Carbon Residue (10% Bottoms), Wt. percent: |  |  |  |  |
| Unblended | .02 | .05 | .14 | .13 |
| Blended with Stock B |  |  | .10 | .19 |
| Blending Value |  |  | .15 | .33 |
| Potential Sediment, Mg./100 ml |  |  |  |  |
| Suspended Sediment, Mg/100 ml | 0.6 | 0.01 | 3.6 | 0.5; 1.4 |
| Color, TR | 0.4 |  |  | 0.2 |
| Colorhold, TR | +1(S) |  | 13½ | 13 |
| Doctor Test | 14¼ |  | ¾ | 1¼ |
| Westphal Gravity | DNP |  | DNP | DNP |
| Bromine Number, cg./g | .8410 |  | .9202 | .9171 |
| Mercaptan Number, mg. S/100 ml | 3.0 |  | 15.6 | 8.7 |
| Total Sulfur, Wt. percent | 68 | 0 | 3.3 | 4.3 |
|  | 0.446 |  | 1.118 | 1.124 |

In these experiments a catalyst was employed which contained about 15% of cobalt molybdate supported on an alumina obtained by the reaction of sodium aluminate, aluminum sulfate and sodium silicate in an aqueous medium maintained at a pH of about 9 to 10. The alumina precipitated by this technique was filtered, washed and dried and impregnated with cobalt molybdate, all as specifically described in connection with Figure 1. For comparative purposes, the heating oils identified were also hydrofined with a cobalt molybdate catalyst supported on a conventional form of silica-free alumina and also a commercially available form of cobalt molybdate supported on alumina.

In a first series of experiments, heating oil A, identified in Table I, was hydrofined with the catalyst of this invention; the operating conditions and the results of this treatment are indicated in Table II for two typical test runs:

Table II

HYDROFINING WEST TEXAS LIGHT VIRGIN HEATING OIL (STOCK A) OVER CATALYST OF THE PRESENT INVENTION

|  | Run A | Run B |
|---|---|---|
| Operating Conditions: |  |  |
| Temperature, °F | 599 | 602 |
| Feed Rate, v./hr./v | 2.32 | 5.20 |
| Pressure, p.s.i.g | 204 | 201 |
| Feed Gas: |  |  |
| Rate, s.c.f./b | 630 | 369 |
| Percent H₂ | 100 | 100 |
| Product Inspections: |  |  |
| Distillation— |  |  |
| IBP, °F | 320 | 310 |
| 5% | 390 | 390 |
| 10% | 402 | 400 |
| 20% | 418 | 416 |
| 30% | 431 | 428 |
| 40% | 443 | 492 |
| 50% | 455 | 453 |
| 60% | 467 | 465 |
| 70% | 480 | 478 |
| 80% | 493 | 491 |
| Carbon Residue (10% Bottoms), Wt. Percent: |  |  |
| Unblended | 0.00 | 0.00 |
| Blended with Stock D | 0.03 | 0.03 |
| Blending Value | −0.07 | −0.07 |
| Sulfur, Wt. Percent | 0.08 | 0.16 |
| Doctor Test | Pass | Pass |

It will be noted from this data that the hydrofining of heating oil stock A in contact with the catalysts of the present invention serves to reduce the carbon residue of the treated heating oil to zero. The blended carbon residue values shown were obtained by blending the treated heating oil in a 50–50 proportion with a caustic washed heating oil having a carbon residue on 10% bottoms of 0.10; this was stock D, identified in Table I. It will be observed that the final blend had a carbon residue value of only 0.03. The blending value indicated in the table is obtained by calculating the carbon residue which would be expected on the basis of the averaged values of the blended stocks as compared to the value actually obtained. For example, since hydrofined stock A had a carbon residue of 0, while stock D had a carbon residue of 0.13, it could be expected that a 50–50 blend of these stocks would provide a carbon residue of about 0.07. Since the actual carbon residue of the blend was only 0.03, however, the blending value of hydrofined stock A is calculated to be −0.07.

In other words, this data shows that by employing the catalyst of this invention, the treated heating oil has the unexpected property of actually reducing the carbon residue inspection on blending with an inferior oil below the value which could be expected on the basis of average inspection values. This data demonstrates that heating oil hydrofined in contact with the catalyst of this invention exhibits a synergistic compatibility on blending with heating oil which has not been specially processed.

In a second series of experiments to evaluate the catalysts of the present invention, heating oil C, identified in Table I, was subjected to a mild hydrofining treatment. The conditions applied and results of this treatment are shown in Table III.

Table III

HYDROFINING HEAVY CATALYTIC HEATING OIL (STOCK C) OVER CATALYST OF THE PRESENT INVENTION

Operating conditions:
  Temperature, °F _____ 602
  Feed Rate, v/hr./v _____ 1.21
  Pressure, p.s.i.g. _____ 204

Feed gas:
  Rate, s.c.f./b _____ 919
  Percent H₂ _____ 100

Production inspections:
  Distillation—
    IBP, °F _____ 395
    5% _____ 480
    10% _____ 502
    20% _____ 529
    30% _____ 551
    40% _____ 571
    50% _____ 591
    60% _____ 610
    70% _____ 628
    80% _____ 647

Carbon residue (10% bottoms), wt. percent:
  Unblended _____ 0.02
  Blended with 50% of Stock B _____ 0.02
  Blending value _____ −0.01
  Sulfur, wt. percent _____ 0.46
  Doctor test _____ Pass It will be observed from this data that the catalyst of this invention was extremely effective in improving the burning characteristics of the heating oil which was treated, reducing the carbon residue value of this oil to only 0.02. The blended carbon residue value indicated in the table was obtained by blending the heating oil which was treated in 50–50 proportions with a doctor sweetened virgin heating oil B of the nature indicated in Table I. Again, it will be observed that the hydrofining treatment with the catalyst of this invention resulted in a negative blending value, demonstrating an unexpected superiority of the catalyst for improving heating oils.

As brought out by the data of Tables II and III, the catalyst of this invention is remarkably effective in improving the burning quality of heating oils. The superiority of this catalyst is particularly marked by the characteristic that on blending heating oils, which have been hydrofined in contact with catalysts produced in accordance with this invention, with other normally incompatible heating oils, an unexpected improvement in the final blended carbon residue values results. In view of these results, it may readily be seen that these catalysts can be used to substantially improve the total output of blended heating oil from a refinery by reducing the proportion of this heating oil which must be subjected to special processing to pass burning quality inspections.

For comparative purposes, reference may be made to comparable hydrofining runs using conventional catalysts. In one such experimental run, heating oil A, indicated in Table I, was treated with a cobalt molybdate catalyst supported on a conventional silica-free alumina base. The conduct of this process and the results obtained are set forth in Table IV.

Table IV

HYDROFINING VIRGIN HEATING OIL (STOCK A) OVER CONVENTIONAL COBALT MOLYBDATE CATALYST

Operating conditions:
  Temperature, °F _____ 600
  Feed Rate, v./v./hr. _____ 1.01
  Reactor pressure, p.s.i.g. _____ 200
  Hydrogen rate, s.c.f./b _____ 1077

Product inspections:
  Gravity, °API _____ 37.1
  Distillation—
    IBP, °F _____ 284
    5% _____ 381
    10% _____ 398
    20% _____ 415
    30% _____ 429
    40% _____ 440
    50% _____ 453
    60% _____ 465
    70% _____ 478
    80% _____ 492

Table IV.—Continued

| | |
|---|---|
| 90% | 508 |
| 95% | 520 |
| FBP, °F | 536 |
| Recovery, percent | 98.0 |
| Loss, percent | |
| Carbon residue (10% bottoms), wt. percent: | |
| Unblended | .06 |
| Blended with 50% of Cracked H.O. (0.18 carbon Residue) | .11 |
| Blending value | .04 |
| Color, Tr | 21½ |
| Colorhold, TR | 21 |
| Doctor test | Passes |
| Westphal gravity | .8367 |
| Bromine number | |
| Mercaptan number, mg. S/100 ml. | 0.39 |
| Sulfur, weight percent | .045 |

It will be noted from this data that while the conventional hydrofining catalyst was capable of improving the burning characteristics of the heating oil, this improvement was not nearly as marked as that obtained by the use of the catalyst of this invention. Again, it will be noted that the blending value of the treated heating oil was a positive rather than a negative value, indicating that the heating oil is somewhat less compatible for blending purposes than that produced with the catalyst of this invention.

Again, for comparative purposes, a heating oil hydrofining run was conducted employing a commercially available form of cobalt molybdate on alumina. From previous experimental work, it had been established that this commercial catalyst was the most active commercially available catalyst. This catalyst was employed to hydrofine heating oil A, identified in Table I. The conduct and results of this experiment are shown in Table V.

Table V

HYDROFINING VIRGIN HEATING OIL (STOCK A) OVER COMMERCIALLY AVAILABLE HYDROFINING CATALYST

| | |
|---|---|
| Operating conditions: | |
| Temperature, °F | 600 |
| Feed rate, v./v./hr | 1.02 |
| Reactor pressure, p.s.i.g | 200 |
| Total gas feed (reactor inlet): | |
| Percent hydrogen | 100 |
| Hydrogen rate, s.c.f./b | 1066 |
| Product inspections: | |
| Gravity, °API | 37.3 |
| Distillation— | |
| IBP, °F | 312 |
| 5% | 386 |
| 10% | 400 |
| 20% | 415 |
| 30% | 427 |
| 40% | 442 |
| 50% | 453 |
| 60% | 466 |
| 70% | 478 |
| 80% | 491 |
| 90% | 507 |
| 95% | 520 |
| FBP, °F | 536 |
| Recovery, percent | 98.3 |
| Loss, percent | |
| Carbon residue (10% bottoms), wt. percent: | |
| Unblended | .02 |
| Blended with 50% of cracked H.O. (carbon residue 0.18) | .11 |
| Blending value | .04 |
| Color, TR | +19(S) |
| Colorhold (P.S. test), TR | +16(S) |
| Doctor test | Passes |
| Westphal gravity | .8361 |
| Bromine number, cg./g | |
| Mercaptan number, mg.S/100 ml | 0.0 |
| Total sulfur, wt. percent | .017 |

Again, it will be observed that use of the conventional catalyst in this hydrofining operation failed to completely eliminate blending incompatibility as indicated by the higher blending value.

To recapitulate briefly, the present invention relates to preparing improved alumina catalyst supports and catalysts made therefrom. The hydrotreating catalysts forming the subject matter of the present invention consist of the alumina carrier prepared from the materials and by the techniques described and a conventional active hydrotreating catalyst component such as molybdenum oxide, chromium oxide, cobalt oxide, nickel oxide, tungsten oxide, vanadium oxide, cobalt molybdate, molybdenum sulfide, nickel-tungsten sulfide, platinum, palladium, and the like.

The present invention relates to the use of catalyst supports of the type described containing 1 to 5 weight percent of silica in the hydrotreating of hydrocarbon fractions. It has been found that the inclusion of silica in the catalyst carrier or base greatly improves the catalyst composition for the silica in the carrier yields a catalyst composition of good activity, good selectivity, and also provides a catalyst which in the form of a powder of fluidizeable size possesses good resistance to attrition when employed in the form of a fluidized bed in a hydroforming or other hydrotreating process. The percentage of silica may be varied from 0.5 to 5.0% according to the service to which the catalyst is to be subjected or the desired results. The low silica content is used where a minimum degree of hydrocracking of the paraffins is desired.

With respect to the proportions of sodium aluminate and aluminate sulfate used in preparing the present catalyst carrier or base, these may vary somewhat from the proportions heretofore given. It has been found, however, that both salts should be used for best results. Furthermore, during the several washings of the slurry or precipitate originally formed, the sodium content of the base material is reduced to not more than one-tenth of 1% sodium expressed as NaOH.

As pointed out previously, in preparing a molybdenum oxide-containing catalyst, a good procedure is the so-called "dry-mix" procedure in which molybdenum oxide ($MoO_3$) is mixed with the proper amount of the present base and heated to a temperature of from 1000°–1400° F., whereupon the molybdenum oxide is vaporized and distributed homogeneously throughout the base material. At the higher temperatures, the incorporation of the molybdenum oxide into the base is accomplished by this procedure in a matter of a few minutes.

In the case of a platinum-containing catalyst, the intermediate concentrate method is preferably employed, namely, the improved base is impregnated so as to contain, say, 5–10% by weight of platinum and then mechanically mixed with the present base in proportion such that the final mixture will contain from about 0.2–0.5 weight percent platinum based on the total weight of the catalyst.

The catalysts prepared according to the foregoing disclosure have been found to possess greatly improved properties when used in the form of a fluidized bed since tests in a pilot plant unit and also in a commercial fluid hydroforming plant have demonstrated that the present new catalysts possess high activity, selectivity, and resistance to attrition. The method of spray drying the catalyst is instrumental in enabling control of the particle size of the catalyst. The catalyst has also been found to be stable at the high temperatures utilized in regenerating the catalyst and the catalyst has also demonstrated that its activity is maintained for a long period of time.

This application is a continuation-in-part of application Serial No. 318,000, filed October 31, 1952, and now abandoned.

What is claimed is:

1. The process of hydroforming hydrocarbon fractions boiling within naphtha boiling range which comprises contacting feed naphtha vapors in admixture with a hydrogen-containing gas with a fluidized bed of finely divided catalyst comprising a carrier containing a major proportion of alumina and a minor proportion of silica upon which a hydroforming catalyst is distributed in a hydroforming reaction zone, said carrier being prepared by reacting together sodium aluminate, aluminum sulfate, and sodium silicate in an aqueous medium maintained at a pH of from 9 to 10 followed by filtering of the resultant precipitate, washing and drying the precipitate, maintaining the reactants and catalyst in said reaction zone under active hydroforming conditions of temperature, pressure, and residence time and recovering from said reaction zone a hydroformed naphtha product of improved octane rating.

2. The method set forth in claim 1 in which the catalyst carrier contains from about 0.5 to 5.0 weight percent of silica.

3. The method set forth in claim 1 in which the precipitate is spray dried.

4. The method set forth in claim 3 in which the catalyst carrier is in the form of hard microspheres.

5. The method of preparing hydroforming catalysts which possess high activity and high attrition resistance when used in processes involving the use of the fluidized solids technique which comprises reacting together sodium aluminate, aluminum sulfate, and sodium silicate in an aqueous medium maintained at a pH of about 9 to 10, filtering and washing the resultant precipitate, drying, and heating the resultant silica-containing alumina, and incorporating an active hydroforming catalyst into the alumina-silica composition.

6. The method as set forth in claim 5 in which the alumina-silica composition is spray dried to form hard, attrition-resistant microspheres and thereafter mixed while the silica alumina carrier and the hydroforming component are in the dry state, and heating at a temperature sufficiently high to vaporize the hydroforming component comprising molybdenum oxide and cause it to be uniformly distributed throughout the alumina-silica composition.

7. The method as set forth in claim 5 in which the alumina-silica composition is impregnated with an aqueous solution of a compound of a platinum group metal, thereafter dried and heated to activate the thus formed catalyst composition.

References Cited in the file of this patent

UNITED STATES PATENTS

| | | |
|---|---|---|
| 2,429,981 | Bates | Nov. 4, 1947 |
| 2,437,532 | Huffman | Mar. 9, 1948 |
| 2,446,799 | Winding | Aug. 10, 1948 |
| 2,463,508 | Bates | Mar. 8, 1949 |
| 2,487,563 | Layng | Nov. 8, 1949 |
| 2,508,014 | Davidson | May 16, 1950 |
| 2,602,772 | Haensel | July 8, 1952 |